United States Patent [19]

Hendrickson

[11] 4,292,650
[45] Sep. 29, 1981

[54] STV SUBSCRIBER ADDRESS SYSTEM

[75] Inventor: Melvin C. Hendrickson, Elmhurst, Ill.

[73] Assignee: Zenith Radio Corporation, Glenview, Ill.

[21] Appl. No.: 88,902

[22] Filed: Oct. 29, 1979

[51] Int. Cl.³ .............................................. H04N 7/16
[52] U.S. Cl. .................................. 358/123; 358/114; 358/117; 358/122
[58] Field of Search ............... 358/114, 117, 122, 123, 358/124, 84

[56] References Cited

U.S. PATENT DOCUMENTS

| | | | |
|---|---|---|---|
| 3,668,307 | 6/1972 | Face et al. | 358/86 |
| 3,676,580 | 7/1972 | Beck | 358/84 |
| 3,878,322 | 4/1975 | Sullivan | 340/152 T |
| 3,919,462 | 11/1975 | Hartung et al. | 358/117 |
| 4,081,832 | 3/1978 | Sherman | 358/84 |

Primary Examiner—S. C. Buczinski

[57] ABSTRACT

A system for selectively addressing a plurality of television receivers, each of the receivers being identified by a unique n-bit address code, comprises means for transmitting a prefix code which is common to the p most significant bits of a group of address codes during a first horizontal scanning line of the vertical interval of a broadcast television signal. A plurality of suffix codes, each comprising the n-p least significant bits of a different one of the n-bit address codes of the group, are transmitted during each of a series of subsequently occurring horizontal scanning lines of the vertical interval for completely identifying the address codes of the group. Each television receiver includes a decoder for identifying when its associated address code has been transmitted in the form of a corresponding prefix and suffix code.

20 Claims, 3 Drawing Figures

ST V SUBSCRIBER ADDRESS SYSTEM

BACKGROUND OF THE INVENTION

The present invention relates in general to improved methods for selectively addressing a large number of remote terminals and, more particularly, to an improved method for selectively addressing a large number of television receivers for controlling the operation thereof.

Various forms of "pay television" systems are known in the art, some of the systems finding relatively widespread current use while others offer promise for increased implementation in the future. In general, all such systems normally contemplate the transmission, either by cable or over the air, of a special television signal which may be received and appropriately processed only by certain authorized television receivers. The means by which certain television receivers are so authorized to process the specially transmitted television signal while others are not varies from system to system, a rather simple example of which may comprise a coin-operated enabling device.

Subscription-television represents a somewhat more sophisticated form of such "pay television" systems. In subscription-television systems, see, for example, U.S. Pat. No. 3,202,758, a scrambled television signal is transmitted over the air and received and processed by a subscriber's television receiver which includes a special converter circuit operable for unscrambling the received signal. The unscrambling circuit may be rented by the viewer for allowing reproduction of specially transmitted programs so long as payment therefor has been made. Other forms of "pay television" include the so-called cable television systems. In these systems, the television signals are transmitted over special frequency bands such that their reception and processing may be controlled and limited to only authorized viewers or subscribers.

In systems of the foregoing type it is useful to provide a facility whereby the authorization to receive the specially transmitted programs may be selectively controlled by the broadcaster. For example, in subscription-television systems, the situation might arise where a subscriber has not tendered his rental payments. In such a case, it would be desirable to render the subscriber's converter circuit inoperative until the rental payment is received. A similar situation would arise upon the theft of a converter circuit wherein it would be desirable to render the stolen circuit inoperative. Yet another situation in which it would be desirable to provide a facility for selectively controlling the authorization to receive and process transmitted programs arises in the case of certain special programs. Assume, for example, that a flat rental fee is charged for authorization to receive most normally broadcast programs but that an additional fee is required for certain special programs, such as a heavyweight boxing match. Until the additional fee is paid, the subscriber's converter circuit would be rendered inoperative for receiving the special program although remaining able to receive otherwise normally transmitted programming.

To facilitate the foregoing, i.e. the selective control of program processing authorization, it has been proposed to identify each subscriber by a uniquely addressable binary code stored in a register or the like associated with the subscriber's converter circuit. Each subscriber's converter circuit would thereby be uniquely addressable such that its operation could be controlled as desired. It has further been proposed that addressing of selected subscribers be accomplished by transmitting the corresponding address codes together with a particular control code, during several otherwise unused horizontal scanning lines of the broadcast signal, e.g. horizontal lines 10, 11 and 12 of the vertical interval. In such a system, each subscriber's converter circuit would include suitable comparison means for comparing its associated stored address code to each transmitted address code and, in response to detection of a condition of equality therebetween, perform the operation represented by the transmitted control code, e.g. rendering the converter inoperative.

In order to implement an addressing scheme as described above, it is anticipated that address codes consisting of 20 data bits will be required to accommodate the large number of potential system subscribers. Since each horizontal scanning line of a television signal includes about 50 microseconds of active time, a single line may be used to transmit a maximum of about 25 data bits at a data bit rate of about 500 Khz. Therefore, a 20 bit address code together with a 5 bit control code requires the use of a full horizontal scanning line for transmission. Two address codes, together with the associated control codes, could then be completely transmitted during two respective horizontal scanning lines, three address codes during three respective horizontal scanning lines, and so on. Considering the use of horizontal scanning lines 10, 11 and 12 during the vertical interval for the transmission of the data, implementation of the foregoing technique, i.e. wherein each designated horizontal scanning line carries a single subscriber address code, allows the transmission of three address codes per field of the television signal or only sixty address codes per second. Although this limitation is not especially troublesome when only a small number of subscribers are being addressed, it becomes quite constraining when a large numer of subscribers need to be addressed. For example, in the previously mentioned situation where a special program is to be transmitted for which an additional fee must be paid by the subscribers, it is not unreasonable to anticipate that 5 million or more subscribers would have to be addressed for rendering their converters inoperative. Such would necessitate the transmission of address codes during a continuous time period of about ten hours which is considered to be an unacceptably long period of time. It is accordingly a primary object of the present invention to provide an addressing system utilizing a predetermined number of horizontal scanning lines, which addressing system allows for the transmission of address codes at an increased rate as compared to that achieved by transmitting a single subscriber address code during each of the designated horizontal scanning lines.

DESCRIPTION OF THE PREFERRED EMBODIMENT

Figure 1:
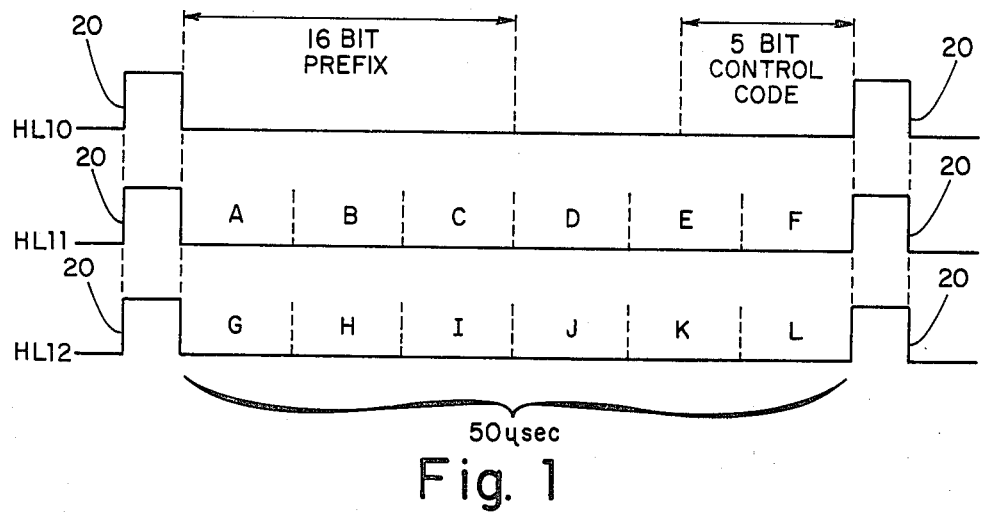
FIG. 1 diagrammatically depicts the method of transmitting address codes during the tenth, eleventh and twelfth horizontal scanning lines of the vertical interval of a broadcast television signal according to the present invention.

Referring to the drawings, FIG. 1 diagrammatically illustrates the improved method of addressing a large number of television receivers according to the present invention. Represented in this figure are three horizontal scanning lines, specifically the 10th, 11th and 12th horizontal scanning lines occurring during the vertical interval of each field of a standard broadcast television signal. In accordance with present television broadcasting standards, a single frame of video information consists of two interlaced fields of horizontal scanning lines. The interlaced fields are broadcast at the rate of 60 per second so that 30 frames of video are formed during each second of signal transmission. Each field includes a portion referred to as the vertical interval comprising a number of horizontal scanning lines during which no video information is transmitted. The horizontal scanning lines occurring during the vertical interval, as well as the horizontal scanning lines used to transmit video information, are each defined by a pair of adjacent horizontal fly-back pulses, e.g. pulses 20 in FIG. 1, and occupy an active time period of about 50 microseconds. Therefore, at a data bit rate of 500 Khz, 25 bits of data can be transmitted during each line. As a consequence, if in a subscription television system or the like, 12 different subscribers, each being identified by a unique 20 bit address code A-L, are addressed employing a technique whereby each of three 25 bit vertical interval horizontal scanning lines is used to transmit a single 20 bit address, 4 fields or 2 frames of video must be transmitted for a total time duration of about 0.067 seconds to address all 12 subscribers. Now, as the number of addressed subscribers increases, the time required to transmit the respective address codes proportionally increases, so that, for example, a full hour is required to transmit the address codes for 648,000 subscribers. The present invention provides a technique whereby this addressing rate may be significantly increased while still employing only the three same horizontal scanning lines to effect data transmission.

At this point, it should be mentioned that while in the preceding example, as well as in the discussion of the invention following herein, it is assumed that address codes are transmitted only during 3 horizontal scanning lines of the vertical interval, this limitation is provided for purposes of example only and should be considered accordingly. Thus, the invention is equally applicable to systems where more than 3 vertical interval horizontal scanning lines, for example up to 10 or 11 of such lines, are used to transmit address codes.

According to the invention, the address codes of a selected segment of the subscriber population are grouped such that all of the address codes having a common prefix, the 16 most significant bits for example, are identified. This common 16-bit prefix, together with an appropriate control code, is transmitted during one horizontal scanning line during the vertical interval, the particular line selected for this purpose being purely a matter of design choice, while a number of the associated 4-bit suffixes are transmitted during a number of different horizontal scanning lines. In this regard, the horizontal lines selected for transmission of the prefix and suffix codes are completely arbitrary and can occur in any order and, in fact, could occur during different frames. Referring to the previous example, assume that the address codes A-L, identifying 12 different subscribers, have a common 16-bit prefix. This prefix is transmitted, together with a 5-bit control code, during a first horizontal scanning line while six of the 4-bit suffixes are transmitted during the next horizontal line and the remaining six 4-bit suffixes during the final of the three horizontal scanning lines.

The foregoing is illustrated in FIG. 1 wherein it is assumed that the three lines employed for address code transmissions are the 10th, 11th and 12th horizontal scanning lines occurring during the vertical interval of each transmitted field. Horizontal line 10 therefore contains the 16-bit common prefix followed by a 5-bit control code. Horizontal line 11 contains six different 4-bit suffixes A-F and horizontal line 12 contains another series of six different 4-bit suffixes G-L. The information transmitted during these three lines therefore uniquely identifies each of the twelve subscribers.

It will be seen that 12 address codes have thereby been transmitted during the same time interval previously required to transmit only three address codes. Although employing this prefix-suffix arrangement limits system flexibility to address subscribers on a random basis, the benefit of increased system capacity is realized so that a larger number of subscribers may be addressed in a given time.

Figure 2:
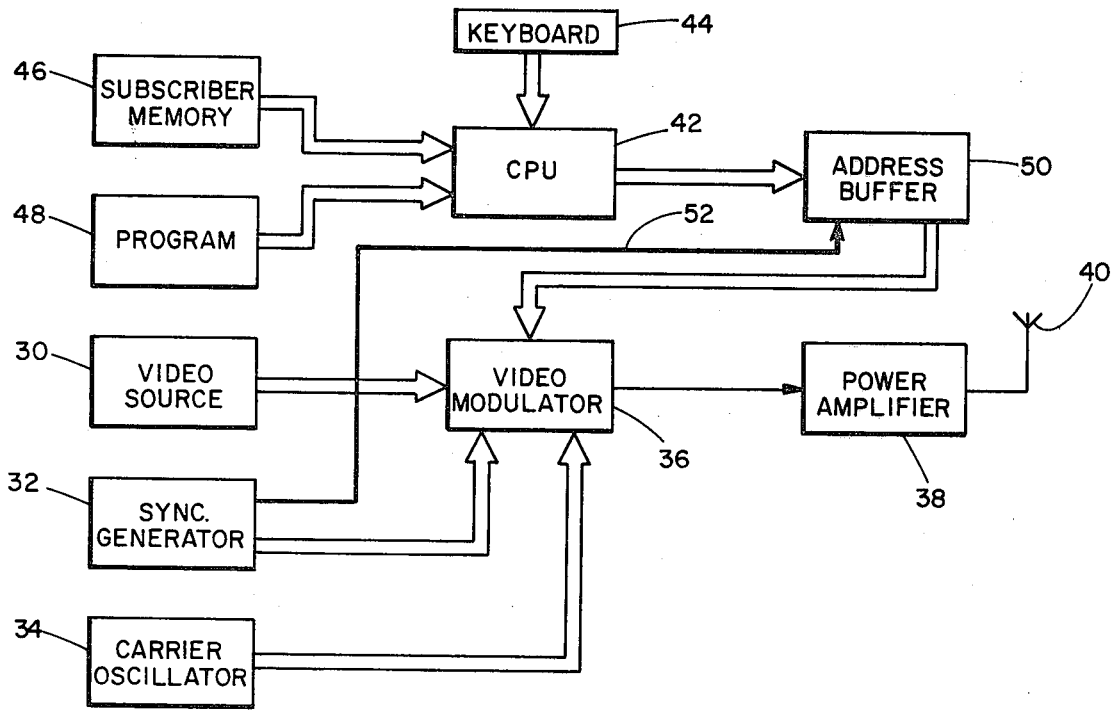
FIG. 2 shows, in block diagram form, an embodiment of a television signal transmitter configured for transmitting address codes according to the coding arrangement of FIG. 1.

FIG. 2 is a block diagram of a standard television signal transmitter suitably modified for selectively transmitting subscriber address codes according to the aforementioned prefix-suffix arrangement. The transmitter conventionally includes a video source 30, a sync generator 32 and a carrier oscillator 34 all supplying a video modulator 36. The output of the video modulator 36, which comprises a standard television signal, is amplified by a power amplifier 38 and transmitted via an antenna 40. This circuitry provides for the transmission of a standard television signal in a well known manner, which signal includes both composite video components and composite sync components.

In addition to the foregoing, the transmitter shown in FIG. 2 also includes the necessary circuitry for generating the prefix-suffix code arrangement for transmission on selected horizontal scanning lines of the vertical interval of the television signal. In particular, this circuitry consists of a digital computer comprising a central processing unit (CPU) 42, a keyboard entry device 44, a subscriber memory 46, a program 48 and an address buffer 50. The subscriber memory 46 contains a listing of all 20-bit subscriber address codes while the program 48 comprises a suitable set of instructions for enabling the CPU 42 for grouping the selected address codes, as identified via the keyboard 44, into a suitable sequence of prefixes and suffixes as described above. The address code prefixes and suffixes, together with a selected control code, are sequentially loaded in address buffer 50 which, in response to signals from the sync generator 32 developed on a line 52, impresses the loaded data upon the selected horizontal scanning lines of the composite video signal formed in video modulator 36. The address codes, formed in the prefix-suffix arrangement of the invention, are consequently broadcast via amplifier 38 and antenna 40 together with the rest of the television signal.

Referring again to the previous example wherein the twelve subscribers identified by address codes A-L, all of which have a common 16-bit prefix, are to be addressed during horizontal lines 10, 11 and 12, the CPU 42, under the control of the program 48, is operative for initially identifying the common 16-bit prefix and the 12 associated 4-bit suffixes. The 16-bit prefix, together with a 5-bit control code representing, for example, that the converter circuits of the 12 subscribers are to be rendered ineffective, are first loaded into address buffer 50, and in response to a signal on line 52 signifying the beginning of the tenth horizontal scanning line, impressed on video modulator 36 for transmission. Next, six of the 4-bit suffixes are loaded into address buffer 50 and, in response to a second signal on line 52 signifying the beginning of the eleventh horizontal scanning, impressed on video modulator 36 for transmission. The remaining six of the 4-bit suffixes are then loaded into address buffer 50 and transmitted during the twelfth horizontal scanning line. In this manner, data identifying all twelve subscriber address codes and a selected control code are transmitted during the three designated horizontal lines. As will be explained below, the transmitted codes are received by all television receivers in the subscriber system but only effect the operation of the receivers of the subscribers identified by the transmitted address codes A–L.

While the foregoing discussion, for purposes of simplicity and clarity, has been in terms of addressing only 12 subscribers, it will be appreciated that normally a much larger number of subscribers will be addressed at any given time. The operation of the transmitter, however, remains basically the same regardless of the number of subscribers being addressed. Also, as previously mentioned, the system is not limited to operation in the environment of a subscription television system but is equally applicable for controlling, for example, the television receivers of a cable television system.

Figure 3:
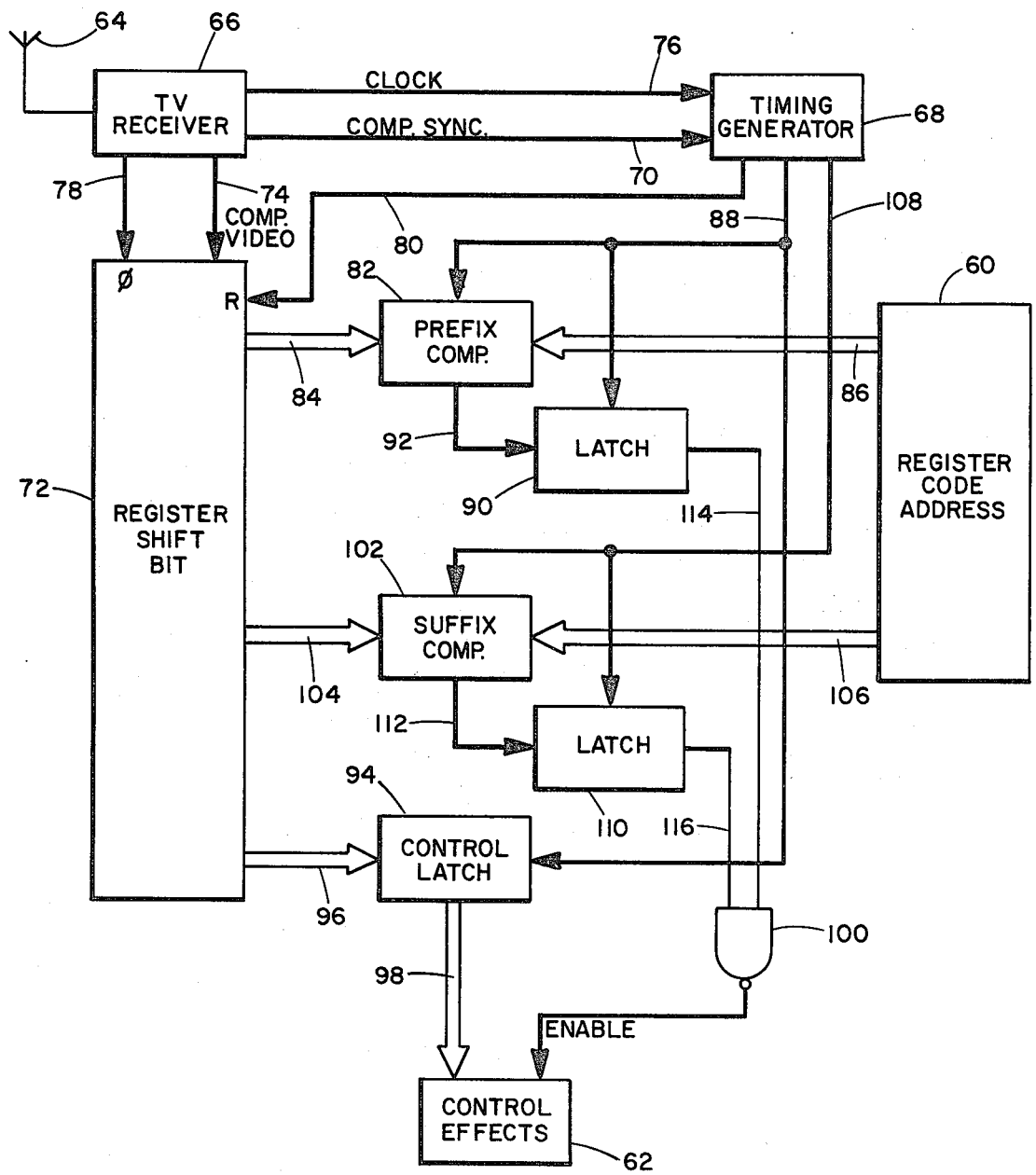
FIG. 3 is a block diagram illustrating a decoding circuit for controlling a television receiver in response to the transmission of address codes according to the coding arrangement of FIG. 1.

FIG. 3 illustrates, in block diagram form, a decoding circuit useful in association with a subscriber's television receiver for processing the address code transmitted in the above described prefix-suffix form. It will be appreciated that each subscriber's television receiver will incorporate a similar decoding circuit, the only difference being the particular address code stored in a 20-bit storage register 60, which address code uniquely identifies the respective subscriber. The basic purpose of the decoding circuit is to compare a subscriber's stored address code to each transmitted address code and, in response to detecting a condition of equality between the stored code and one of the transmitted codes, to operate a control effect circuit 62 in accordance with the transmitted 5-bit control code. In the case of a subscription television signal the control effects circuit may, for example, comprise the subscriber's unscrambling converter which would be rendered inoperative in response to the equality comparison.

Referring in more detail to FIG. 3, each decoding circuit includes a receiving antenna or cable input 64 supplying a conventional television receiver 66. The composite sync signal developed by the receiver 66 is coupled to one input of a timing generator circuit 68 over a conductor 70 while the composite video signal developed by the receiver 66 is coupled to the serial data input of a 25 bit shift register 72 over a conductor 74. A clock signal is also coupled from the receiver 66 to the timing generator 68 over a conductor 76 and to the clock input of the shift register 72 over a conductor 78. The repetition rate of the clock signal developed on conductors 76 and 78 is preferably about 503 Khz, which signal is typically available at the output of a voltage controlled oscillator in the horizontal system of the receiver 66.

The timing generator 68 is designed for identifying horizontal scanning lines in the vertical interval of a standard broadcast television signal used for address code transmissions as well as various intervals within such lines. Circuits adapted for identifying a predetermined horizontal scanning line of a transmitted television signal are well known in the art and are frequently used with VIR systems for identifying the nineteenth horizontal scanning line of each field of video information. Such circuits typically include means for integrating the composite sync signal for identifying a threshold level at a predetermined point during the vertical sync pulse interval. In response to achieving this threshold level, a sensing circuit is operative for enabling a counter for counting subsequently occurring horizontal flyback pulses. The output of the counter may then be suitably decoded for identifying one or more predetermined horizontal scanning lines. U.S. Pat. No. 3,780,218 to Rennick is exemplary of such circuits. Another technique for identifying a predetermined horizontal scanning line is disclosed in U.S. Pat. No. 4,160,993 issued on July 10, 1979 to Richard G. Merrell. In the Merrell application, the horizontal flyback pulse counting sequence is initiated in response to the logical characteristics of the vertical sync pulse satisfying a certain preselected criteria. The timing generator 68 may comprise either types of circuits, although the latter is preferred in that it is considered less susceptible to erroneous operation in response to a noisy sync signal.

The timing generator 68 includes a first output conductor 80 on which is developed a pluse identifying vertical interval horizontal scanning lines 10, 11 and 12 during each transmitted field for resetting the shift register 72 (assuming address code transmission only during such lines as explained above). Thus, at the beginning of horizontal scanning line 10, the shift register 72 is reset and subsequently operated, in response to the clock signal developed on conductor 78, whereby the binary data occurring during horizontal scanning line 10 of the composite video signal is serially shifted into the register. It will be recalled that the data transmitted during horizontal scanning line 10 comprises a 16 bit prefix together with a 5 bit control code such that, after 21 bit times following the reset pulse, the first 21 stages of the shift register 72 will be characterized by the 16 bit prefix and the 5 bit control code.

The 16 outputs of the shift register 72 corresponding to the 16 bit prefix stored therein are coupled to a first input of a prefix comparator 82 over a 16 conductor bus 84. The prefix comparator 82 includes a second input supplied by a second 16 conductor bus 86 for receiving the 16 most significant bits of the subscriber's address code stored in the address code register 60. The prefix comparator 82 is enabled by a pulse developed on a line 88 from the timing generator 68, which pulse occurs 21 bit times after the reset pulse identifying horizontal scanning line 10, for comparing the 16 bit prefix in the shift register 72 with the 16 most significant bits of the subscriber's address code stored in register 60. If the two 16 bit binary words are identical a latch 90, enabled concurrently with the prefix comparator 82, is set by a signal developed on an output conductor 92 of prefix comparator 82, otherwise the latch is not set.

The signal developed on conductor 88 is also operative for enabling a 5 bit control latch 94 for reading and storing the 5 bit control code stored in the shift register 72 and coupled to the control latch by a 5 conductor bus 96. The control latch, in turn, is operative for coupling the latched control code to the control effect circuit 62 over an output 5 conductor bus 98 only in response to an enabling signal developed at the output of an AND gate 100. The operation of AND gate 100 will be described in further detail hereinafter.

Upon the occurrence of horizontal scanning line 11, another reset pulse is developed on conductor 80 by the timing generator 68 for resetting the shift register 72. Shift register 72 is subsequently operated in response to the clock signal developed on conductor 78 whereby the binary data occurring during horizontal scanning line 11 of the composite video signal developed on conductor 74 is serially shifted into the register. It will be recalled that the data transmitted during horizontal scanning line 11 comprises six 4 bit suffixes identifying, in association with the previously transmitted 16 bit prefix, six individual subscriber address codes. Thus, following 24 bit times after the reset pulse identifying horizontal scanning line 11, the first 24 stages of the register 72 will be characterized by the six 4 bit suffixes.

The 24 outputs of the shift register 72 corresponding to the six 4 bit suffixes stored therein are coupled to a first input of a suffix comparator 102 over a 24 conductor bus 104. The suffix comparator 102 includes a second input supplied by a 4 conductor bus 106 for receiving the four least significant bits of the subscriber's address code stored in the address code register 60. The suffix comparator 102 is enabled by a pulse developed on a line 108 from the timing generator 68, which pulse occurs 24 bit times after the reset pulse identifying horizontal scanning line 11, for comparing the four least significant bits of the subscriber's address code stored in the register 60 with each of the six 4 bit prefixes coupled by bus 104 from the shift register 72. If the four least significant bits of the subscriber's address code are identical to any one of the six 4 bit suffixes a latch 110, enabled concurrently with the suffix comparator 102, is set by a signal developed on an output conductor 112 of the suffix comparator, otherwise the latch 110 is not set.

The suffix comparator 102 may comprise six individual 4 bit comparators each having a first input connected for receiving a respective one of the 4 bit suffixes stored in the shift register 72. The second input of each of the six 4 bit comparators would be connected to bus 106 and the outputs of the six comparators would be connected via an OR gate to conductor 112 for operating latch 110. Alternatively, the suffix comparator 102 may comprise a single 4 bit comparator sequentially operated for comparing the six 4 bit suffixes, one at a time, with the four least significant bits of the subscriber's address code stored in the register 60.

Upon the occurence of horizontal scanning line 12 another reset pulse is developed on conductor 80 resetting the shift register 72. The shift register 72 is consequently operated for storing the six 4 bit suffixes transmitted during horizontal scanning line 12 of the composite video signal. The six 4 bit suffixes are coupled to the suffix comparator 102 by bus 104 and compared to the four least significant bits of the subscriber's address code developed on bus 106 in response to an enabling signal developed on conductor 108 twenty-four bit times after the reset pulse identifying horizontal scanning line 12. As described above with respect to horizontal scanning line 11, if one of the comparisons is satisfied the latch 110 is set by a signal developed on conductor 112. The foregoing procedure wherein the binary data transmitted during horizontal scanning lines 10, 11 and 12 of the composite video signal is compared to the subscriber's address code stored in the register 60 is continuously repeated as long as address code prefixes and suffixes are transmitted.

From the foregoing, it will be seen that a transmitted address code corresponding to a subscriber's address code stored in the register 60 will result in both latches 90 and 110 being set. The outputs 114 and 116 of the latches 90 and 110 are connected to the inputs of the AND gate 100. Consequently, the AND gate 100 is effective for enabling the control effects circuit 62 in accordance with the 5 bit control code developed on bus 98. As mentioned previously, this may, for example, result in rendering the address subscriber's unscrambling converter circuit in a television subscription system inoperative.

While there has been described a particular embodiment of the present invention, it will be apparent that changes and modifications may be made therein without departing from the invention in its broader aspects. The aim of the appended claims, therefore, is to cover all such changes and modifications as fall within the true spirit and scope of the invention.

I claim:

1. In a system wherein each of a plurality of television receivers is identified by a unique address code, a method for addressing selected ones of said plurality of television receivers comprising the steps of:
    transmitting during a first predetermined horizontal scanning line of the vertical interval of a broadcast television signal an address code portion which is common to the address codes identifying at least a group of said selected television receivers;
    transmitting during a second predetermined horizontal scanning line of the vertical interval of a broadcast television signal the remaining portions of the address codes identifying at least two of said selected television receivers of said group; and
    decoding said transmissions for addressing said at least two television receivers.

2. A method for selectively addressing a plurality of television receivers, each of said television receivers being identified by a unique address code, comprising the steps of:
    identifying a group of said address codes having a common prefix comprising a predetermined number of most significant bits whereby each of said identified address codes is characterized by a different suffix comprising a predetermined number of least significant bits;
    transmitting said common prefix during a first predetermined horizontal scanning line of the vertical interval of a broadcast television signal; and
    transmitting a plurality of said different suffixes during a second predetermined horizontal scanning line of the vertical interval of a broadcast television signal.

3. The method according to claim 2 including the step of transmitting an additional plurality of said different suffixes during a third predetermined horizontal scanning line of the vertical interval of a broadcast television signal.

4. The method according to claim 2 including the step of decoding said transmitted prefix and said transmitted suffixes at the site of each of said television receivers for identifying the television receivers associated with said group of address codes.

5. The method according to claim 4 wherein said decoding step comprises storing at the site of each of said television receivers the associated identifying address code and comparing at the site of each of said television receivers the stored address code with said transmitted prefix and said transmitted suffixes.

6. The method according to claim 4 including the step of operating a television receiver function of each of said identified television receivers.

7. A system for selectively addressing a plurality of television receivers, each of said television receivers being identified by a unique n-bit address code, comprising:
   means for transmitting during a first predetermined horizontal scanning line of a broadcast television signal a prefix code which is characterized by a sequence of bits which are identical to a predetermined number p of the most significant bits of each of a group of said n-bit address codes;
   means for transmitting during a second predetermined horizontal scanning line a plurality of suffix codes each comprising the n-p least significant bits of a different one of said n-bit address codes of said group; and
   decoding means associated with each of said television receivers for identifying the television receivers associated with an address code corresponding to said transmitted prefix code and to one of said transmitted suffix codes.

8. A system according to claim 7 including means for transmitting during a third predetermined horizontal scanning line an additional plurality of suffix codes each comprising the n-p least significant bits of further different ones of said n-bit address codes of said group.

9. A system according to claim 8 wherein each of said decoding means comprises first comparison means operative for comparing said transmitted prefix code with the p most significant bits of the address code associated with the respective television receiver and second comparison means for comparing each of said transmitted suffix codes with the n-p least significant bits of the address code associated with the respective television receiver.

10. A system according to claim 9 wherein each of said television receivers includes a function operable in response to concurrent equality comparisons by said first and second comparison means.

11. A decoding circuit operable in association with a television receiver for determining coincidence between an n-bit receiver address code identifying said television receiver and an n-bit transmitted address code comprising a p-bit prefix code and an (n-p) bit suffix code, said prefix and suffix codes being transmitted respectively during different ones of the horizontal scanning lines of a broadcast television signal, said decoding circuit comprising:
   first means for storing said n-bit receiver address code;
   second means responsive to said transmitted television signal for storing the p-bit prefix code and the (n-p) bit suffix code transmitted during said different ones of said horizontal scanning lines;
   means responsive to said first and second means for comparing said stored p-bit prefix code with the p most significant bits of said stored receiver address code and for comparing said stored (n-p) bit suffix code with the (n-p) least significant bits of said stored receiver address code; and
   logic means for developing a signal indicating coincidence between said receiver address code and said transmitted address code in response to both of said comparisons indicating conditions of equality.

12. The decoding circuit of claim 11 wherein a plurality of different (n-p) bit suffix codes are transmitted during one of said horizontal scanning lines, said means for comparing comprising means for comparing each of said different (n-p)-bit suffix codes with the (n-p) least significant bits of said stored receiver address code, said logic means developing said signal in response to said prefix comparison and any one of said suffix comparisons indicating conditions of equality.

13. The decoding circuit of claim 12 wherein said second means comprises means for temporarily storing in time succession the p-bit prefix code transmitted during a first of said horizontal scanning lines and the plurality of (n-p) bit suffix codes transmitted during a second of said horizontal scanning lines.

14. The decoding circuit of claim 13 wherein said second means comprises a multibit shift register having a data input connected for receiving the composite video signal from said television receiver and means for resetting said shift register at the beginning of each of said first and second horizontal scanning lines.

15. The decoding circuit of claim 13 wherein said means for comparing is operative for effecting said comparisons in a time successive manner in coordination with said second means.

16. The decoding circuit of claim 15 wherein said means for comparing comprises prefix comparator means operable for comparing said temporarily stored p-bit prefix code with the p most significant bits of said stored receiver address code and first latch means for developing an output signal in response to an equality condition therebetween.

17. The decoding circuit of claim 16 wherein said means for comparing further comprises suffix comparator means operable for comparing each of said plurality of temporarily stored (n-p) bit suffix codes with the (n-p) least significant bits of said stored receiver address code and second latch means for developing an output signal in response to an equality condition between any one of said plurality of comparisons.

18. The decoding circuit of claim 17 wherein said logic means comprises a coincidence gate responsive to said first and second latch means.

19. A decoding circuit operable in association with a television receiver for determining coincidence between an n-bit receiver address code identifying said television receiver and an n-bit transmitted address code comprising a p-bit prefix code and an (n-p) bit suffix code, said prefix code being transmitted during one of the horizontal scanning lines of a broadcast television signal and a plurality of different ones of said suffix codes being transmitted during a different one of the horizontal scanning lines of said broadcast television signal, said decoding circuit comprising:
   first means for storing said n-bit receiver address code;
   second means responsive to said transmitted television signal for storing said p-bit prefix code and said plurality of (n-p) bit suffix codes transmitted during said different ones of said horizontal scanning lines;

means responsive to said first and second means for comparing said stored p-bit prefix code with the p most significant bits of said stored receiver address code and for comparing each of said plurality of stored (n-p) bit suffix codes with the (n-p) least significant bits of said stored receiver address code; and logic means for developing a signal indicating coincidence between said receiver address code and a transmitted address code in response to said prefix comparison and any one of said suffix comparisons indicating conditions of equality.

20. A decoding circuit operable in association with a television receiver for determining coincidence between an n-bit receiver address code identifying said television receiver and an n-bit transmitted address code comprising a p-bit prefix code and an (n-p) bit suffix code, said prefix code being transmitted during one of the horizontal scanning lines of a broadcast television signal and a plurality of different ones of said suffix codes being transmitted during a different one of the horizontal scanning lines of said broadcast television signal, said decoding circuit comprising:

first means for storing said n-bit receiver address code;

second means responsive to said transmitted television signal for temporarily storing in time succession the p-bit prefix code transmitted during said one horizontal scanning line and the plurality of (n-p) bit suffix codes transmitted during said different horizontal scanning line;

prefix comparator means for comparing said temporarily stored p-bit prefix code with the p most significant bits of said stored receiver address code and including first latch means for developing an output signal in response to an equality condition therebetween;

suffix comparator means for comparing each of said plurality of temporarily stored (n-p) bit suffix codes with the (n-p) least significant bits of said stored receiver address code and including second latch means for developing an output signal in response to an equality condition between any one of said plurality of comparisons; and logic means coupled to said first and second latch means for developing a signal indicating coincidence between said receiver address code and a transmitted address code in response to coincidence between said latch means output signals.

* * * * *